Oct. 23, 1962   O. D. DU BORD   3,059,302
HOLDER FOR A FLEXIBLE ELECTRICAL CONDUIT
Filed April 8, 1960   2 Sheets-Sheet 1
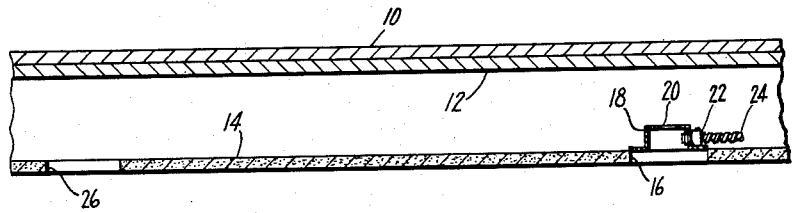
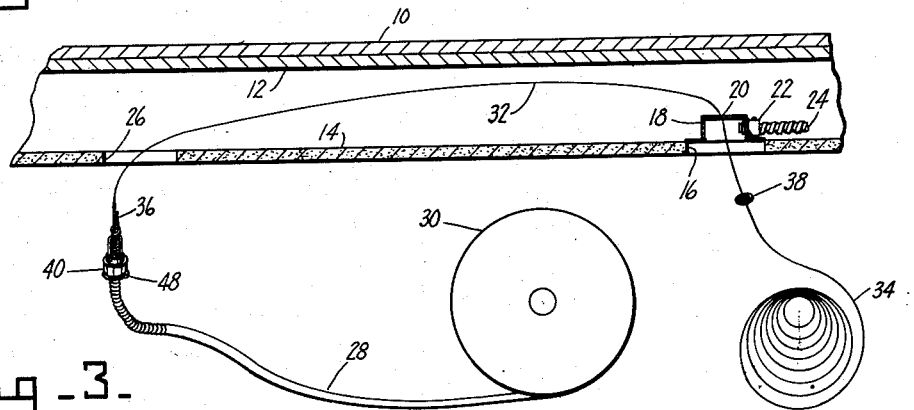
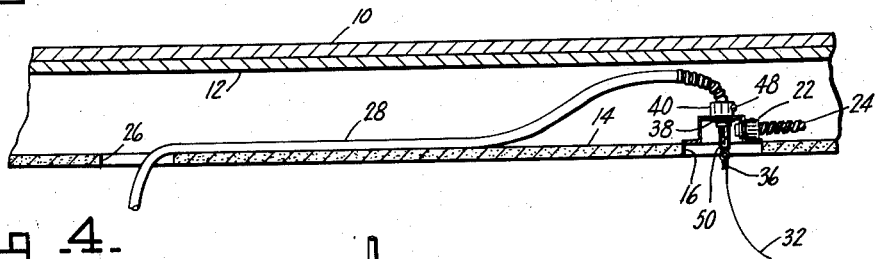
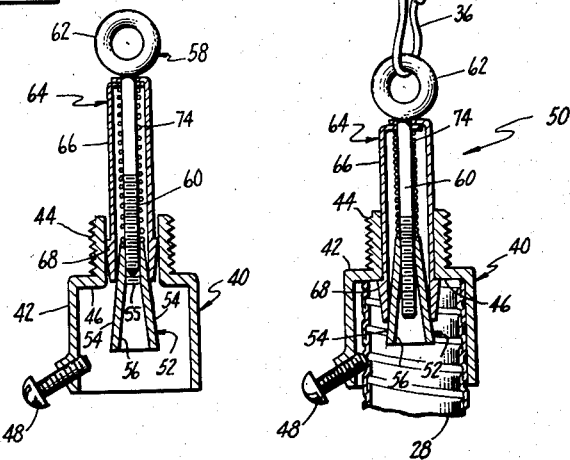
INVENTOR.
OLIVER D. Du BORD
BY
Stuart R. Peterson
Attorney Oct. 23, 1962 O. D. DU BORD 3,059,302
HOLDER FOR A FLEXIBLE ELECTRICAL CONDUIT
Filed April 8, 1960 2 Sheets-Sheet 2
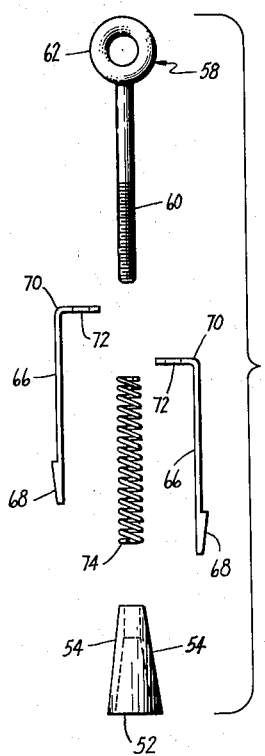
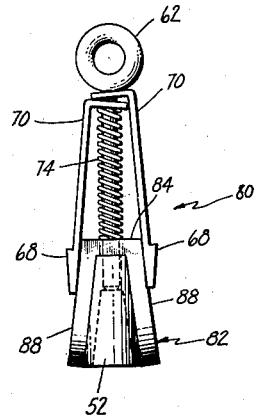
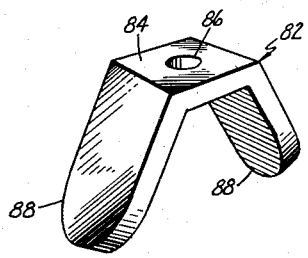
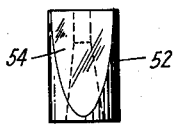
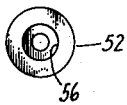
INVENTOR.
OLIVER D. Du BORD
BY
Stuart R. Peterson
Attorney

United States Patent Office 3,059,302
Patented Oct. 23, 1962

3,059,302
HOLDER FOR A FLEXIBLE ELECTRICAL
CONDUIT
Oliver D. Du Bord, 810 Kennedy Court, Fargo, N. Dak.
Filed Apr. 8, 1960, Ser. No. 21,039
2 Claims. (Cl. 24—211)

This invention relates generally to electricians' tools or equipment, and pertains more particularly to a holder for engaging the connector at the end of a flexible electrical conduit so that the conduit can be conveniently pulled during its installation by means of a conventional fish tape.

One important object of the invention is to provide a holder for engaging what are commonly termed Greenfield connectors at the end of a flexible electrical conduit which holder will provide a positive gripping action so that the holder will not become inadvertently detached during its use.

Another object of the invention is to provide a holder of the envisaged character which will accommodate connectors of various sizes. More specifically, it is an aim of the invention to provide a single holder which will accommodate two or three sizes of connectors without modification. However, it is within the contemplation of the invention to provide one or more adapters so that the same basic structure can be utilized over a wide range of connector sizes.

A further object of the invention is to provide a holder that will be inexpensive, thereby encouraging its widespread use.

Another object of the invention is to provide a holder for Greenfield connectors which is of lightweight construction and sufficiently compact so that it can be readily carried in the electrician's pocket.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 1 is a sectional view showing the typical space or void existing between the ceiling of a room and the floor or roof thereabove, the view depicting an existing fixture outlet and a new hole spaced therefrom for a new outlet that is to be wired;

FIGURE 2 is a view similar to FIGURE 1 but showing a conventional fish tape attached to a holder constructed in accordance with the teachings of this invention, the holder in turn being engaged with a connector at the end of a flexible electrical conduit which is to be installed in the void between floor levels;

FIGURE 3 is a view corresponding to FIGURES 1 and 2 but illustrating the flexible conduit after it has been fully installed and just prior to the disengagement of my holder from the connector at the end of the flexible conduit to which it has been originally attached for enabling the conduit to be pulled into its depicted position;

FIGURE 4 is a longitudinal sectional view through a typical Greenfield connector and my holder which is in the process of being inserted into the Greenfield connector;

FIGURE 5 is a view similar to FIGURE 4, but illustrating the holder in a gripping relationship with the connector, the end of the conduit to be pulled having also been added to this view;

FIGURE 6 is an exploded view of my holder, the separation of the various component parts assisting materially in showing the constructional details thereof;

FIGURE 7 is a side elevational view of the wedge member of FIGURE 6, the view being taken at right angles from which the member appears in FIGURE 6;

FIGURE 8 is a bottom view of the wedge member as it would appear in either FIGURE 6 or FIGURE 7;

FIGURE 9 is an elevational view of my holder, the holder in this instance having an adapter so that the holder can be used for connectors of larger size than in FIGURES 4 and 5, and FIGURE 10 is a detailed perspective view of the adapter itself, the adapter being shown on a larger scale than in FIGURE 9.

It is believed that FIGURES 1, 2 and 3 will be very helpful in providing a full understanding of the benefits to be derived with the present invention. Accordingly, attention is now directed to these three views. In FIGURE 1, a finished floor or roof 10 has been shown which is above a rough floor 12. A finished ceiling has been shown in a spaced relationship with the rough flooring 12, thereby providing the usual void between joists.

It will be observed that the finished ceiling 14 has an opening at 16 which has associated therewith an outlet box 18 of conventional construction, boxes of this type having what are commonly referred to as knock-out sections. At 20 an aperture appears as a result of the knock-out section having been removed at this location. Inasmuch as it has been assumed that the outlet box 18 has previously been installed for servicing an existing fixture, the box 18 has attached thereto a Greenfield connector denoted generally by the reference numeral 22. In usual manner, the connector 22 is attached to a Greenfield flexible electrical conduit 24, also of conventional construction. Spaced from the opening 16 is a second opening 26 where a new outlet is to be installed.

Passing now to a description of FIGURE 2, it can be seen from an inspection of this figure that the new flexible conduit that is to be installed has been given the reference numeral 28. Whatever length of conduit 28 is needed can be removed from the spool denoted by the numeral 30. In order to pull the conduit 28 through the opening 26 and the void between the ceiling 14 and the flooring 12 thereabove, it is customary to use what is referred to as a fish tape 32. This fish tape 32 is carried about in the form of a roll 34 and has a hook 36 at its free end. As can be seen from FIGURE 2, the fish tape 32 is inserted into the void via the aperture 20 after first having passed a lock nut 38 over the hook 36, the lock nut performing a function presently to be mentioned. The hook 36 at the free end of the fish tape 32, after having been pushed through the void, emerges from the opening 26 and is thereby rendered available for attachment to the electrical conduit 28.

Mention has already been made of the previously installed Greenfield connector 22 and the Greenfield flexible conduit 24. A similar Greenfield connector is now to be referred to and has been designated in its entirety by the reference numeral 40. Although these connectors are quite conventional, nonetheless some general description will now be given in order to set the background for the use of the applicant's holder which will soon be described in detail. Accordingly, from FIGURES 4 and 5 it will be discerned that a cylindrical portion 42 constitutes one integral part of the Greenfield connector 40, this portion or sleeve having an externally threaded bushing 44 integral therewith. Owing to the difference in diameters between the sleeve 42 and the bushing 44, an internal shoulder 46 is provided. For the purpose of fixedly retaining the connector 40 to the flexible conduit 28, a set screw 48 is employed which when tightened will bear against the end of the conduit 28 that has been inserted into the cylindrical portion of sleeve 42 (see FIGURE 5).

For the purpose of exemplifying the instant invention, my holding device has been denoted generally by the reference numeral 50 and appears in FIGURES 4, 5 and 6, the last-mentioned figure being of the exploded type. It will be seen that the holder 50 comprises a wedge member 52 formed with sloping surfaces 54 tapering toward each other at the upper end of this member. A threaded bore 55 extends from the upper end of the wedge member 52 downwardly through part of the axial length of said member. This threaded bore 55 communicates with a flaring unthreaded bore 56.

The device 50 also includes an eye bolt 58 having a threaded shank 60 and an eye or enlarged head 62. As can readily be noted from FIGURES 4 and 5, the threaded shank 60 is received in the bore 55.

Arm means denoted generally by the reference numeral 64 are also employed as an important part of the holder 50. The arm means include a pair of L-shaped elements which provide deflectable arms 66 having at their lower ends gripping fingers 68 which may be of any desired configuration, such as merely pressing detents into the material so that outwardly protruding bulges are provided rather than the pronounced fingers as shown in the drawing. Also, for sturdiness of construction it is highly desirable that the arms 66 be curved or arcuate when viewed in transverse cross section but for drawing simplicity the curvature has not been illustrated. The upper ends of the L-shaped elements have inwardly directed and overlaping portions 70 (best seen in FIGURE 6), each having an aperture 72 registrable with the other and of a size so as to accommodate the threaded shank 60. Intermediate the inwardly directed portions 70 and the upper end of the wedge member 52 is a coil spring 74 which encircles the threaded shank 60. In this way, the arms 66 are urged toward the head 62 inasmuch as the spring 74 reacts against the wedge member 52 to achieve this biasing action.

Having presented the foregoing information, it is believed that the manner in which my holder 50 clamps or grips the Greenfield connector 40 is readily apparent. However, a brief specific reference to FIGURE 4 may be of assistance in fully understanding the way in which the device operates. All that need be done is to insert the member 52 into the Greenfield connector 40. The extent to which the member 52 is inserted is relatively unimportant. For example, the fingers 68, as shown in FIGURE 4, are in this situation within the confines of the threaded bushing 44. They could remain in this relationship and the head or eye 62 then rotated so as to advance the threaded shank 60 relative to the member 52. Such action would cause the member 52 to move upwardly and the sloping surfaces 54 would cam or wedge outwardly the fingers 68 at the lower ends of the arms 66 so as to firmly grip the interior of the bushing 44. On the other hand, the fingers 68 can be more fully inserted so that when the head 62 is rotated to raise the member 52, the fingers will be urged outwardly to engage the shoulder 46, as pictured in FIGURE 5.

Before inserting the hook 36 through the aperture 20, though, the user should "thread" said hook through the lock nut 38. The fish tape 32 can then be payed from the roll 34 until the hook 36 emerges via the opening 26.

Whether the electrican elects to insert the tool 50 only partially as illustrated in FIGURE 4 or to a fuller degree as shown in FIGURE 5 makes little difference, inasmuch as a very firm and positive gripping action is produced in either situation. Such a gripping action enables the user to pull the conduit 28 from the position in which it appears in FIGURE 2 to that in which it appears in FIGURE 3 after engaging the hook 36 with the eye bolt 58. Having pulled the conduit 28 into position, the electrician can then apply the locking nut 38 to the threaded bushing 44 and the Greenfield connector 40 can then be secured in place on the outlet box 18.

It will be appreciated that by reason of the instant invention, an electrician is enabled to very easily pull a flexible conduit, such as the conduit 28, into the position in which it is to remain after installation. No precutting of the conduit is necessary as in the past, for after it has been pulled into the position of FIGURE 3, the electrician can then cut the end thereof adjacent the new opening 26. Also, it is important to realize that the conduit 28 cannot become hooked or inadvertently engaged with joists or other obstacles in its path when my device 50 is employed. In this latter regard, it has been customary to attach the fish tape 32 to conductors within a flexible conduit and then pull the conduit into place through the agency of the projecting conductors. Obviously, this allows the forward end to engage joists and other obstructions, as pointed out immediately above.

Whereas the holder 50 in the form depicted in FIGURES 4 and 5 can be used for, say, one-half and three-quarter inch inside diameter connectors, it is within the contemplation of the invention to provide an adapter so that the same device 50 can be modified sufficiently so as to grip the larger mentioned sizes. Accordingly, attention is now directed to FIGURE 9 where the holder has been given a different numeral in order to distinguish it from the previously described holder. The holder in FIGURE 9 bears the reference numeral 80, and it will be immediately seen that the addition to the previously referred to structure includes the adapter which has been designated generally by the numeral 82. The adapter 82 has a bight portion 84 which is formed with an aperture 86 of sufficient diameter so as to freely accommodate the threaded shank 60. Also, the adapter 82 includes outwardly diverging side legs 88 which are to bear against the sloping surfaces 54 on the wedge member 52. Other than the addition of the adapter 82, no other changes are needed in order to modify the device so that it can be used with larger size connectors.

The use of the device labeled 80 is believed readily apparent, especially inasmuch as a complete description has already been given of the holder 50. However, in the present situation, that is where the holder 80 is to be employed, the fingers 68 bear against the sloping sides of the legs 88 rather than against the sloping surfaces 54. The action, obviously, is identical. Of course, different adapters may be provided depending on the size of connector 40 to be engaged.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A holder for pulling a flexible electrical conduit with a fish tape, the holder comprising an elongated wedge member provided with diametrically opposed flat surfaces tapering inwardly from one end toward the other end, said other end having a threaded bore, a pair of deflectable arms having inwardly directed, overlapping sections at one end formed with registrable openings, an eye bolt extending through said openings into said threaded bore, and a coil spring disposed in an encircling relation with said eye bolt intermediate said wedge member and one of said inwardly directed sections, whereby tightening of said eye bolt will cause its head to bear against the inwardly directed section nearest thereto and thus cause said arms to be moved longitudinally so that their free ends will be urged outwardly into engagement with the interior of a connector attached to said conduit.

2. A holder for pulling a flexible electrical conduit with a fish tape, the holder comprising an elongated wedge member provided with a pair of sloping surfaces tapering toward each other at one end, said member having a threaded bore extending axially inwardly at said one end, a threaded shank received at one end in said bore for advancement and retraction relative thereto, said shank having an enlarged head at the other end thereof, and means encircling said shank adjacent said head including a pair of deflectable arms having their free ends slidably engaging said sloping surfaces, whereby advancement of said shank into said bore will cause said enlarged head to pressurally bear against the other end of one of said arms and thereby cause said free arm ends to slide along said surfaces and to be cammed outwardly into expanded engagement with the interior of a connector attached to said conduit, said arm means including a pair of generally L-shaped elements having inwardly directed and overlapping shorter leg portions provided with aligned apertures therein for accommodating said shank, the shorter leg portion of one of said L-shaped elements serving as said other end against which said enlarged head bears.

References Cited in the file of this patent

UNITED STATES PATENTS

| | | |
|---|---|---|
| 65,169 | Card | May 28, 1867 |
| 220,542 | Mull | Oct. 14, 1879 |
| 1,154,883 | Portman | Sept. 28, 1915 |
| 1,419,016 | Capirosso | June 6, 1922 |
| 1,470,423 | Brady | Oct. 9, 1923 |
| 1,603,591 | Ghetti | Oct. 19, 1926 |
| 1,779,035 | Dutton | Oct. 21, 1930 |
| 2,642,768 | Ogburn | June 23, 1953 |
| 2,672,175 | Howard | Mar. 16, 1954 |
| 2,946,616 | Carter | July 26, 1960 |